United States Patent
Makhlouf et al.

(10) Patent No.: US 8,655,304 B2
(45) Date of Patent: Feb. 18, 2014

(54) METHODS AND APPARATUS FOR DETECTING AND MITIGATING RADIO INTERFERENCE AMONG USER EQUIPMENT AND BASE STATIONS OF GEOGRAPHICALLY CO-LOCATED AND SPECTRALLY DISTINCT WIRELESS SYSTEMS

(75) Inventors: Isam R. Makhlouf, Lake Zurich, IL (US); Ethan Y. Chen, Wilmette, IL (US); Xiaowei Jin, Palatine, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 82 days.

(21) Appl. No.: 13/340,135

(22) Filed: Dec. 29, 2011

(65) Prior Publication Data

US 2013/0171955 A1 Jul. 4, 2013

(51) Int. Cl.
*H04M 11/04* (2006.01)
*H04B 1/04* (2006.01)

(52) U.S. Cl.
USPC ............... 455/404.1; 455/426.1; 455/114.1

(58) Field of Classification Search
USPC ............ 455/426.1, 63.1–65, 114.2, 114.3, 455/278.1, 279.1, 296, 297
See application file for complete search history.

(56) References Cited

U.S. PATENT DOCUMENTS

| | | | |
|---|---|---|---|
| 5,857,155 A | 1/1999 | Hill et al. | |
| 6,490,460 B1 | 12/2002 | Soliman | |
| 6,845,246 B1 | 1/2005 | Steer | |
| 2002/0142788 A1* | 10/2002 | Chawla et al. | 455/504 |
| 2007/0189234 A1* | 8/2007 | Heo et al. | 370/335 |
| 2008/0175185 A1* | 7/2008 | Ji et al. | 370/318 |
| 2008/0253300 A1* | 10/2008 | Wakabayashi et al. | 370/252 |
| 2010/0234040 A1 | 9/2010 | Palanki et al. | |
| 2010/0330919 A1 | 12/2010 | Gurney et al. | |
| 2011/0021240 A1* | 1/2011 | Hiltunen et al. | 455/522 |
| 2011/0228680 A1 | 9/2011 | Ball et al. | |
| 2012/0163202 A1* | 6/2012 | Aguirre et al. | 370/252 |

FOREIGN PATENT DOCUMENTS

WO 2010117965 A1 10/2010
WO 2011050843 A1 5/2011

OTHER PUBLICATIONS

Long Term Evolution (LTE) Public Safety Information Sheet by Emergency Response Interoperability Center, dated Sep. 16, 2010.*
Real-World LTE Performance for Public Safety by Motorola, dated Sep. 2010.*

(Continued)

*Primary Examiner* — Lester Kincaid
*Assistant Examiner* — Daniel Lai
(74) *Attorney, Agent, or Firm* — Daniel R. Bestor

(57) ABSTRACT

Methods and apparatus are provided for detecting interference between spectrally distinct wireless communication networks. A first base station in a first network communicates with a first mobile device at a first frequency, and a second base station communicates at a second frequency with a second mobile device geographically co-located with the first mobile device. The power level of an interfering signal received at the first base station from the second mobile device may be estimated by sharing information between the two networks through an interoperability gateway. The path loss of a reference signal transmitted from the first mobile device to its base station is communicated to the gateway, along with a parameter associated with the transmit power level of the interfering signal. Based on this parameter and the reference signal path loss, the received power level of the interfering signal may be inferred.

20 Claims, 6 Drawing Sheets

(56) References Cited

OTHER PUBLICATIONS

PCT Invitation to Pay Additional Fees Dated Apr. 4, 2013 for Counterpart Application PCT/US2012/069274.
Ericsson: "Band 13:Spurious Emission and Sensitivity", 3GPP Draft; R4-081954, 3rd Generation Partnership Project (3GPP), Mobile Competence Centre; France, vol. RAN WG4, No. JEJU; Aug. 26, 2008, XP050180463, Figure 1.
Motorola Mobility: Band 26 Public Safety Protection of Public Safety in 851-854 MHz;, 3GPP Draft; R4-116112, 3rd Generation Partnership Project (3GPP), Mobile Competence Centre; France, vol. RAN WG4, No. San Francisco, USA; 20111114-20111118, Nov. 7, 2011, XP050567516, Entire Document.

* cited by examiner

METHODS AND APPARATUS FOR DETECTING AND MITIGATING RADIO INTERFERENCE AMONG USER EQUIPMENT AND BASE STATIONS OF GEOGRAPHICALLY CO-LOCATED AND SPECTRALLY DISTINCT WIRELESS SYSTEMS

FIELD OF THE DISCLOSURE

The present disclosure relates generally to wireless communication equipment used by public safety agencies and departments, and more particularly to methods, systems and apparatus for detecting and mitigating out of band emissions among user equipment and base stations operating geographically co-located and spectrally distinct wireless communication systems.

BACKGROUND

Hurricanes, tornadoes, floods, and other natural disasters, as well as other life-threatening emergencies, underscore the need for a robust communications infrastructure for use by local, state, and federal emergency response teams. Police departments, fire departments, "911" call centers and other law enforcement personnel increasingly rely upon mobile wireless communication devices to coordinate first response and "on scene" rescue efforts with citizens, dispatchers, and fellow public safety organizations.

The proliferation of cellular telephones, broadband communication devices, and rapidly advancing standards and protocols for their use places a premium on the limited bandwidth allocated for public safety applications. This requires system designers and regulators to utilize available bandwidth more efficiently, without compromising the life-saving missions of these emergency response agencies.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
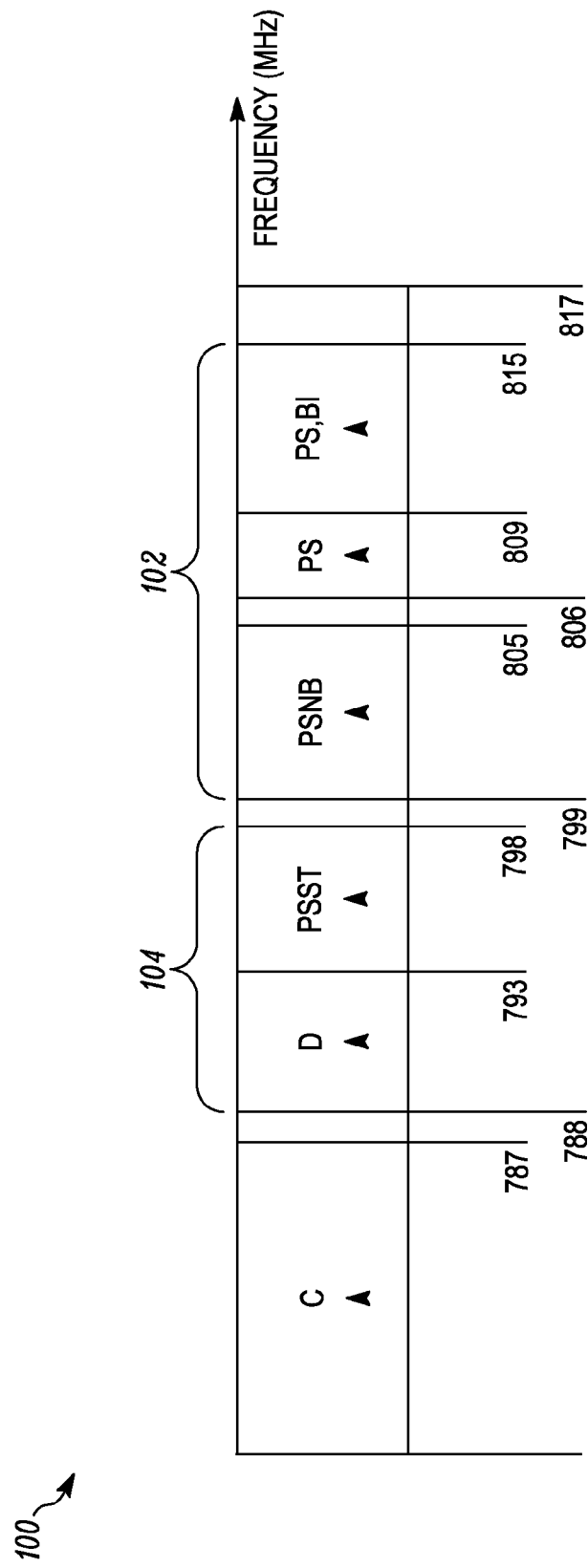
FIG. 1 illustrates a portion of the electromagnetic spectrum including bandwidths allocated to public safety applications in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The Federal Communications Commission (FCC) is responsible for allocating the finite radio frequency spectrum among various government entities, cellular telephone and data carriers, and among a host of corporate and individual interests. In that capacity, the FCC has allocated certain frequency bands for use by and for the benefit of local, state, and national public safety organizations and applications.

In particular, the frequency band including 799 to 815 megahertz has been allocated for uplink (device to base station transmissions) public safety (PS) narrowband (NB) voice communications by police, fire, and other emergency response teams. This channel supports the "push-to-talk" land mobile radio (LMR) two-way radio devices used by law enforcement agencies across the country.

Recently, the FCC has designated the adjacent frequency band from 793 to 798 megahertz for broadband public safety uplink (device to base station transmissions) use. The FCC has mandated the use of 3GPP Long Term Evolution technology (referred to herein as LTE) in this broadband spectrum.

Because the new broadband LTE band is spectrally adjacent to the legacy narrow band voice band, some of the energy from one network may "leak" into the other network. Under certain conditions, this leakage, known as out of band emissions (OOBE), may cause undesirable radio interference between a mobile device of one system and the base station of the spectrally adjacent system. Those skilled in the art will appreciate that radio frequency tuning equipment, such as band pass filters, can selectively determine a desired frequency range to be transmitted; however, OOBE typically cannot be entirely eliminated.

Accordingly, there is a need for methods, systems and apparatus for detecting and mitigating adjacent channel interference, particularly in public safety networks. In addition, a need exists for detecting and mitigating the desensing of user equipment due to intermodulation distortion (IMD).

In accordance with the disclosed embodiments, methods, systems and apparatus are provided for estimating the received power level of OOBE among user equipment and base stations of geographically co-located and spectrally distinct wireless communications networks.

In accordance with an embodiment, a legacy public safety narrow band voice network includes an LMR base station (BS) and a plurality of NB mobile devices used by police officers, firefighters, and other emergency response personnel to communicate with each other, dispatchers, and various responding agencies. A broadband network deployed in an adjacent frequency band includes an LTE (Long Term Evolution) base station (eNB) and a plurality of LTE devices.

An uplink transmission from an LTE device to its LTE eNB may produce Adjacent Channel Interference (ACI) to the LMR BS. Because the interfering signal is out of band, the LMR BS cannot measure its received power directly. However, if the interfering LTE device is geographically co-located with an NB mobile device (e.g., within the same vehicle such as a police car), the received power level of the interfering LTE signal may be estimated by: i) providing information about the interfering transmission (e.g., its transmit power level) from the LTE eNB to the LMR BS via an interoperability gateway; ii) inferring the path loss of the interfering signal from the path loss of a reference signal (e.g., an uplink transmission from the co-located NB mobile device to the LMR BS), the received power of which can be measured by the LMR BS; and iii) subtracting the path loss from the transmit power level of the interfering signal.

In addition, a downlink transmission from the LMR BS to an NB mobile device (some of the energy of which manifests at an LTE device), coupled with an uplink transmission from the LTE device to its LTE eNB, may result in intermodulation distortion (IMD) which desenses the LTE device receiver, particularly when the LTE device is near the transmitting LMR BS. Although the LTE device cannot directly measure the received power level of the downlink transmission from the LMR BS, the received power level of the downlink transmission from the LMR BS may nonetheless be estimated by: i) providing information about the downlink transmission (e.g., its transmit power level) from the LMR BS to the LTE eNB, for example, through the interoperability gateway: ii) inferring the path loss of the downlink transmission from the path loss of an unlink transmission from the NB mobile device to its LMR BS; and iii) subtracting the path loss from the transmit power of the downlink transmission.

Having estimated the received power level of the interfering signal, or other relevant parameter(s) associated with the interfering signal, steps can be taken to mitigate the interference (or IMD), if desired. In this regard, one or both networks can make adjustments to account for the interference. For example, the power level, transmission frequency, or modulation scheme of one or both of the uplink LTE signal and interfering signal may be adjusted. Alternatively, one or both signals may be terminated or rescheduled in accordance with a predetermined decision tree which may include a prioritization hierarchy.

FIG. 1 is a segment 100 from the radio frequency (RF) portion of the electromagnetic spectrum illustrating two exemplary spectrally distinct, adjacent frequency bands in accordance with some embodiments. More particularly, public safety (PS) narrow band (NB) uplink voice band 102 includes frequencies ranging from 799 megahertz to 815 megahertz. An adjacent band 104 includes frequencies ranging from 788 megahertz to 799 megahertz, and is allocated to broadband, LTE compliant public safety communications and applications for the uplink. In particular, the frequency range from 788 to 798 megahertz is currently allocated to the Public Safety Spectrum Trust (PSST), a public safety cooperative organization involved in coordinating the deployment of LTE compliant broadband applications into band 104.

Figure 2:
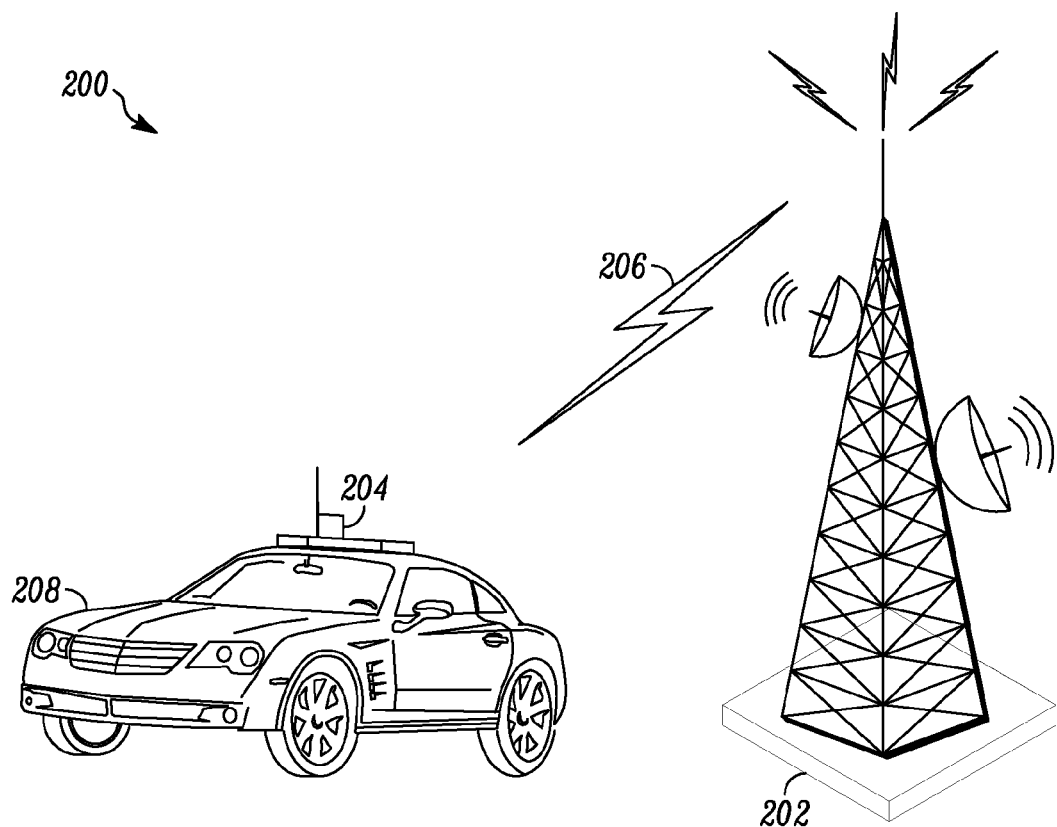
FIG. 2 illustrates an exemplary emergency response vehicle and associated base station in accordance with some embodiments.

FIG. 2 illustrates a portion of an exemplary wireless public safety communications network 200 including a base station 202 and a mobile wireless device 204. It should be appreciated, however, that the wireless networks described herein may contain any number of base stations and associated wireless mobile devices. In FIG. 2, mobile device 204 is illustrated as a box with a simple antenna mounted atop an emergency response vehicle 208, for example a police car. Mobile device 204 may include a transmitter, power booster, receiver, processor, memory, user input and output hardware, and/or the like (not shown). Mobile device 204 may be dash-mounted, hand-held, or removably or permanently affixed to vehicle 208.

In operation, network 200 may employ any desired modulation scheme in any desired frequency range to transmit data packets 206 from base station 202 to mobile device 204 (known as the downlink or DL), and from mobile device 204 to base station 202 (known as the uplink or UL).

One or more of the various mobile wireless communication devices discussed herein, such as mobile device 204, may be, for example, a portable/mobile radio, a personal digital assistant, a cellular telephone, a video terminal, a portable/mobile computer with a wireless modem, or any other wireless communication device. For purposes of this description, such a mobile wireless communication device may also referred to as a subscriber unit, a mobile station, mobile equipment, a handset, a mobile subscriber, a vehicular modem, user equipment, or an equivalent used in any standard. In addition, although not illustrated, such mobile devices may include a Global Positioning System (GPS) capability that allows it to determine GPS coordinates that specify its geographic location. As is well-known in the art, a GPS receiver receives signal information transmitted from a GPS transmitter, and a GPS processor in the mobile device uses this information along with triangulation processing techniques to calculate its geographic location, which can be specified as a latitude coordinate, a longitude coordinate and, optionally, an altitude coordinate.

It should also be noted that various wireless communication networks discussed herein can generally be any type of voice band or broadband radio access network, and that specific non-limiting examples are described herein, where one or more of the broadband radio access networks is a narrow band voice network or a Long Term Evolution (LTE) compliant network that operates in accordance with LTE standards.

As will be appreciated by those skilled in the art, "LTE" refers to an ongoing standards development effort within the 3rd Generation Partnership Project (3GPP), which develops specifications to define improvements to the Universal Mobile Telecommunications System (UMTS), which is described in a suite of Technical Specifications (TS) developed within and publicized by the 3GPP. As of this writing, the most recent version of the 3GPP TSs were published in June, 2011. Enhancements to the UMTS that are described in the LTE standards were first introduced beginning with 3GPP Release 8. 3GPP Release 8 describes an architecture referred to as the Evolved Packet System (EPS), which includes an Evolved UTRAN (E-UTRAN) on the radio access side and an Evolved Packet Core (EPC) on the core network side.

Those skilled in the art will further appreciate that a radio access network (RAN) is part of a mobile telecommunication system. A RAN serves as a bridge between mobile devices, also referred to as wireless communication devices (WCDs), and a core network (CN). Although not illustrated for the sake of clarity, a network can include a number of infrastructure devices for facilitating communications among the various components operating in the system.

Such infrastructure can include elements communicating via an air interface, such as for instance, eNodeBs, base radios, base stations, base transceiver stations, and the like. Each eNodeB or base station may define one or more "cells" (i.e., a cell meaning, in one example, a coverage area of an eNodeB or a coverage area of a base station). Such infrastructure devices may further include an infrastructure core (e.g., an Evolved Packet Core (EPC) in an LTE system) used to allocate resources in the network, with the infrastructure core including elements such as for instance, Mobility Management Entities, Signaling Gateways, Packet Data Network Gateways, and the like.

Other infrastructure devices that may be included in the networks described herein include switches, zone controllers, base station controllers, repeaters, access points, routers, and the like.

Figure 3:
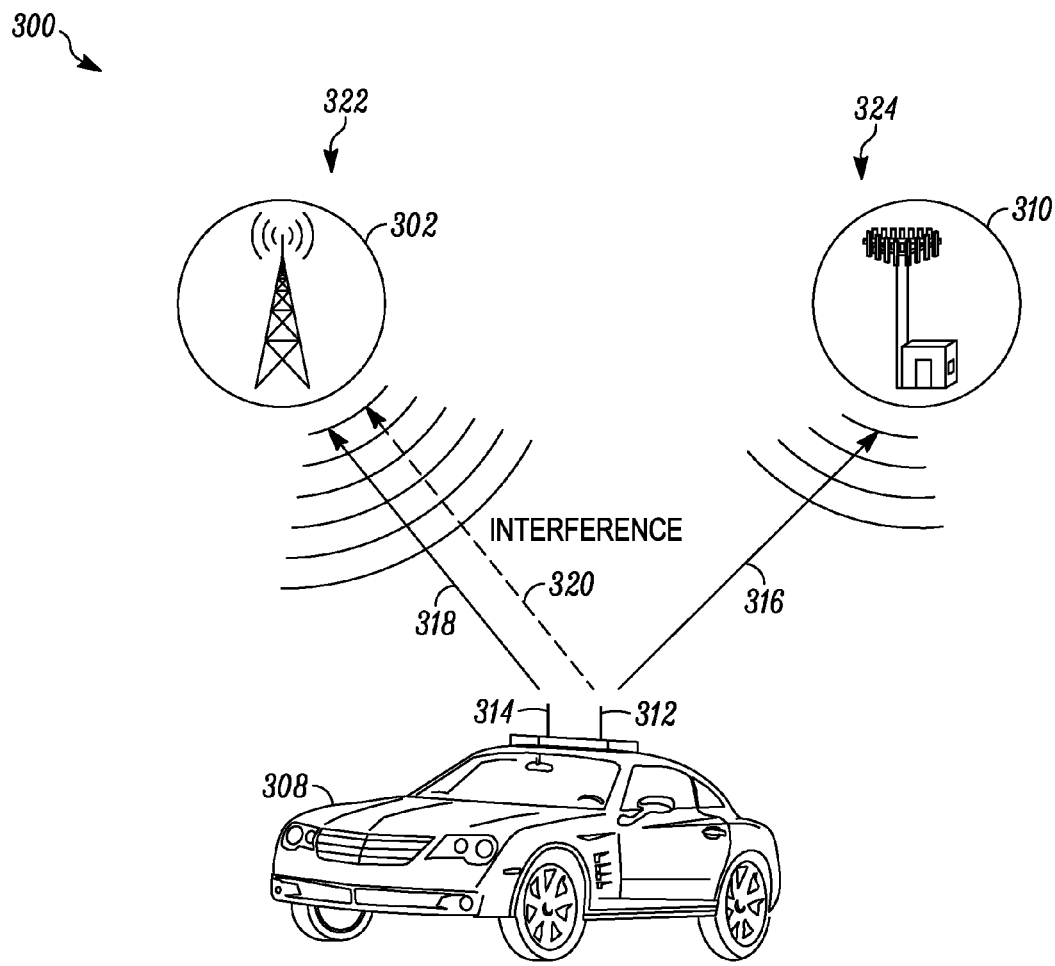
FIG. 3 is a partial schematic block diagram illustrating spectrally adjacent wireless base stations and their associated wireless mobile devices in accordance with some embodiments.

Referring now to FIG. 3, a system 300 for detecting and mitigating interference among user equipment and base stations of geographically co-located and spectrally distinct wireless networks is shown. In this context, "geographically co-located" means that the end user radios (the user equipment) are located in the same police car, fire truck, or other emergency response vehicle; in the same room; or on the same person. In the example of FIG. 3, a first network 322 includes a base station 302 and one or more mobile stations (also referred to herein as wireless mobile devices) 314. As shown, mobile station 314 may be located in a public safety vehicle 308. A second network 324 includes a base station 310 and one or more mobile stations 312. As shown, mobile station 312 may be geographically co-located with mobile station 314 in public safety vehicle 308.

First network 322 operates within a first frequency band and employs a first modulation scheme. Second network 324 operates within a second frequency band and employs a second modulation scheme. In an embodiment, the first and second bands are spectrally distinct but adjacent; that is, the two bands correspond to different frequency bands within the RF spectrum, located next to or near one another in the spectrum (but not overlapping).

With continued reference to FIG. 3, mobile devices 312 and 314 are geographically co-located, meaning that they are temporarily or permanently physically located at the same location, for example in the same room, vehicle, or the like.

In operation, a communication data packet 318, sometimes referred to herein as a reference signal 318, is transmitted via the uplink path from mobile device 314 to base station 302 within network 322. Similarly, a communication data packet 316 is transmitted via the uplink (UL) path from mobile device 312 to base station 310 within network 324. When a channel upon which packet 316 is transmitted is adjacent to the edge of the band allocated to the first network 322, some of the energy associated with the uplink transmission of packet 316 may spill into an adjacent channel of the first frequency band, resulting in an unintended interfering signal 320 (shown as a dashed arrow for clarity).

Interfering signal 320 manifests as an out of band emission in network 322, and constitutes adjacent channel interference (ACI). Problematically, because interfering signal 320 is not within the frequency range of network 322, it is difficult for base station 302 to directly measure the power level at which the out of band interference represented by interfering signal 320 is received at base station 302. In accordance with an embodiment, by sharing operational information between the two networks, and recognizing that mobile devices 312 and 314 are substantially co-located, the received power of signal 320 can be dynamically determined.

Figure 4:
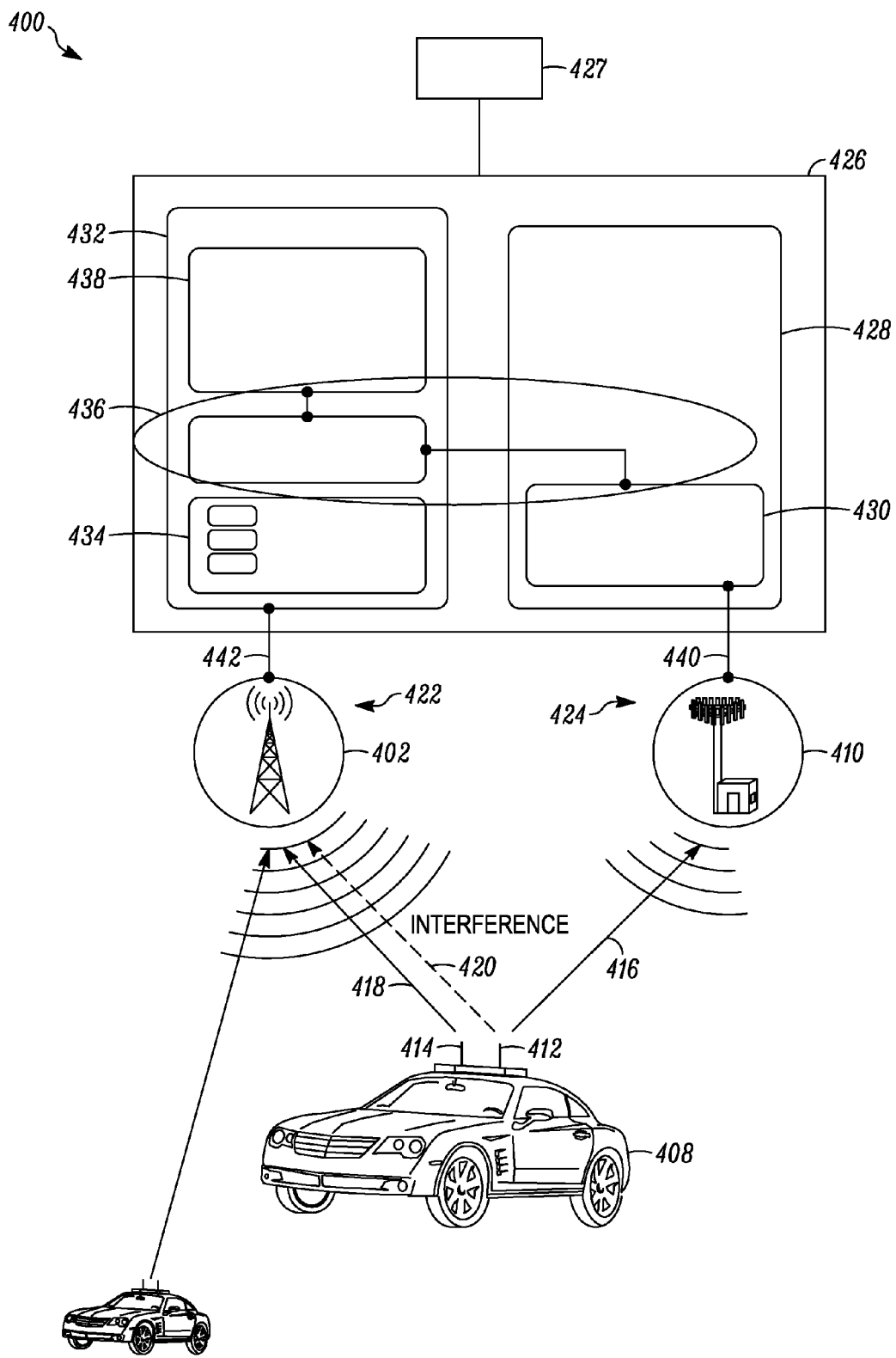
FIG. 4 is a schematic illustration of two wireless base stations broadcasting at different frequencies and using different modulation schemes, geographically co-located wireless mobile devices, and an interoperability gateway which enables inter-communication between two networks that may otherwise be isolated from each other, in accordance with some embodiments.

Referring now to FIG. 4, a system 400 for coordinating the detection and mitigation of adjacent channel interference between two or more wireless networks operating in distinct but adjacent frequency bands is shown. System 400 includes a first network 422 having a base station 402 and an LMR device 414 (also referred to herein as a mobile station) located in a public safety vehicle 408. Network 422 is configured to transmit a data packet (reference signal) 418, via the uplink path, from LMR device 414 to base station 402.

A second network 424 includes a base station 410 and an LTE device 412, co-located with LMR device 414 (e.g., within vehicle 408). Network 424 is configured to transmit, via the uplink path, a data packet 416 to base station 410, potentially resulting in an interfering signal 420.

System 400 further includes a sharing platform 426 including a computer 427 and having a network infrastructure 432 associated with network 422, a network infrastructure 428 associated with network 424, and an interoperability gateway (IG) 436. The interoperability gateway enables inter-communication between the two networks which may otherwise be isolated from each other. Computer 427 may be physically attached to platform 426 or may be operated remotely. Alternatively, computer 427 may be associated with IG 436, with either network infrastructure 428 and 432, or shared among one or more of the foregoing. In an embodiment, computer 427 coordinates interoperability between networks 422 and 424, and facilitates sharing of operational information between network 422 and network 424. Computer 427 may also run applications associated with one or both networks as well as for additional networks (not shown) if desired.

More particularly, network infrastructure 428 may include an LTE network core 430, which communicates with base station 410 through a datalink 440, and which also communicates with network 432 through IG 436.

LTE network core 430 may be distributed among on one or more servers associated with network 424. Alternatively, network core 430 may be implemented on a single machine including, for example, on a server located at base station 410.

Network infrastructure 432 includes an LMR network core 434 and an application server 438. Application server 438 includes a suite of applications used by network 422 relating to the functions and operations of the agency or agencies associated with network 422. LMR network core 434 communicates with base station 402 through a datalink 442, and communicates with network 424 and application server 438 through IG 436. As such, application server 438 may include applications which pertain to network 422, network 424, and/or other networks, as well as the coordination between and interoperability among such networks.

Figure 5:
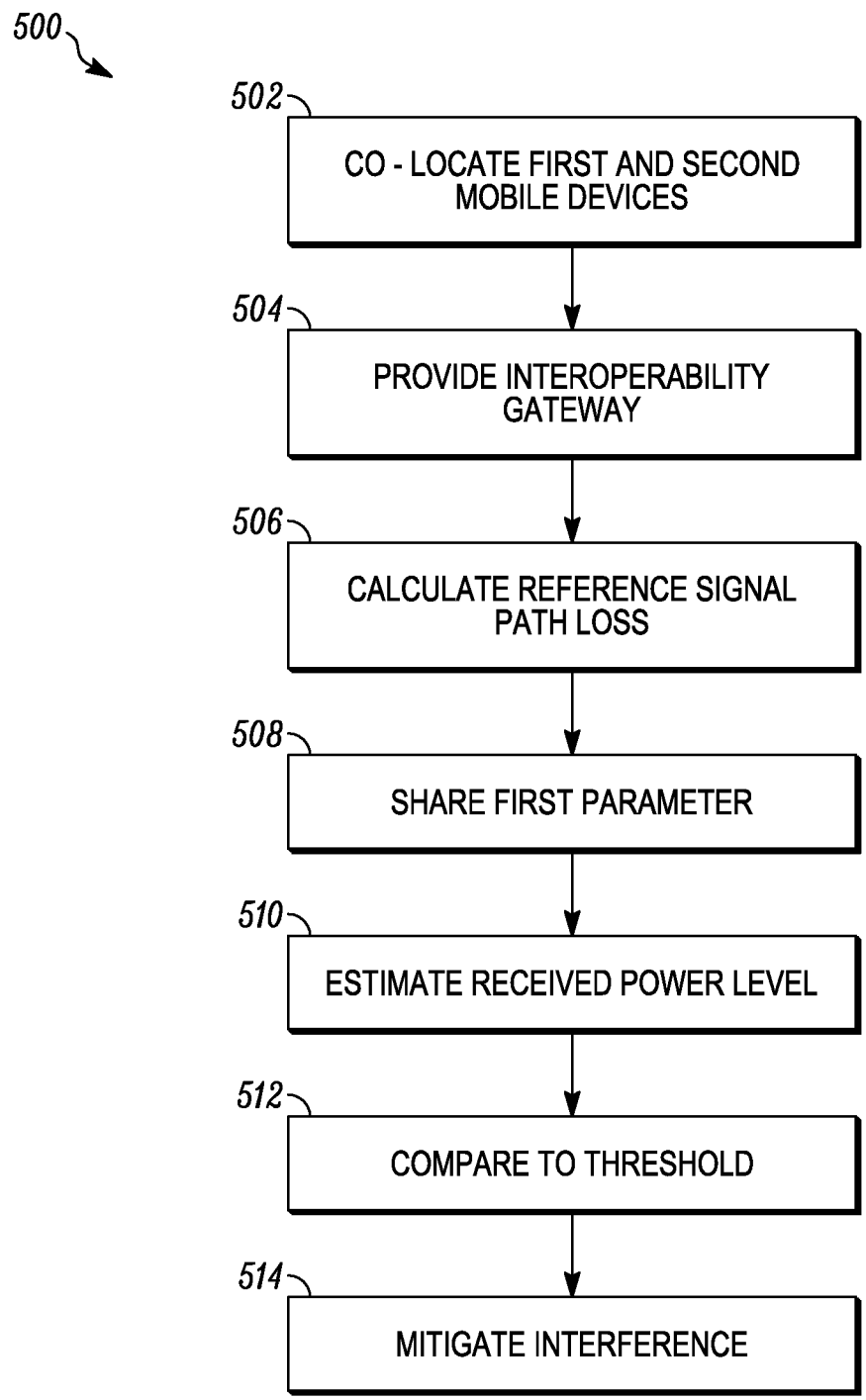
FIG. 5 is a flow diagram illustrating a method of estimating the power level of an interfering signal received from an adjacent channel in accordance with some embodiments.

FIG. 5 shows a method 500 for estimating the power level of an interfering radio signal, which is received at a first base station configured to communicate with a first mobile device at a first frequency, and which is transmitted by a second mobile device configured to communicate with a second base station at a second frequency. The first and second mobile devices may be co-located by physically disposing both devices in the same vehicle such as, for example, a police car, fire truck, ambulance, or other public safety or emergency response vehicle.

The method utilizes an interoperability gateway shared by the first and second base stations such as, for example, IG 436 or any suitable mechanism for communicating operational information between the first and second base stations (or first and second mobile devices).

Method 500 includes the step of determining the path loss of a reference signal transmitted between the first mobile device and the first base station (task 506). In this regard, the first mobile device and the first base station are configured to communicate with each other at a predetermined frequency, and in accordance with a predetermined modulation scheme, both of which are shared by the first mobile device and the first base station. Hence, the power level at which a data packet is transmitted via the uplink path from the first mobile device to the first base station, as well as power level at which the data packet is received by the first base station, are both available to the first base station. The path loss of a reference signal (e.g., a data packet transmitted via the uplink path) may thus be calculated by determining the difference between the transmit power level and the received power level of the data packet transmitted via the uplink path.

Method 500 continues by sharing a measure of the transmit power of the interfering signal with the non-interfering network through the interoperability gateway (task 508). In this regard, a suitable measure of the transmit power may be any parameter associated with the interfering signal (such as its transmit power level) which facilitates the estimation of the power level at which it is received at the first base station. Typically, the transmit power level is either fixed, determined by one or more metrics or algorithms known by the second base station, or is communicated by the second mobile device to the second base station.

Method 500 then estimates the received power level of the interfering signal based on the path loss and the first parameter (task 510). In an embodiment, the received power level of the interfering signal is estimated by subtracting the path loss of the interfering signal (which may be inferred from the path loss of the reference signal when the first and second mobile devices are geographically co-located) from the transmit power level of the interfering signal. Once the received power level of the interfering signal is determined (or estimated), it may be compared to a threshold value (task 512) and, if the threshold value is met or exceeded, remedial action may be commenced to mitigate the interference (task 514).

In an embodiment, such remedial action may involve interference mitigation strategies including one or more of: reducing the transmit power of the interfering signal; delaying or re-scheduling the transmission of reference signal data packets and/or interfering signal data packets; changing one or both the carrier frequencies and/or frequency allocations of the reference signal and interfering signals, for example, by using an alternate frequency channel or frequency resource allocation. Alternatively, once the received power level of the interfering signal is estimated (task 510), it may be used to evaluate system performance, for example, in the context of off-line or real time system diagnostics.

In an embodiment, the power level of an interfering signal is compared to a predetermined threshold value, which may be a "set" (static) value. Such a static threshold value may be established based on the maximum amount of interference which can be tolerated while maintaining effective communication. Alternatively, an interfering signal may be compared to a dynamic, or variable, threshold value; that is, the threshold value may be adaptively adjusted as a function of, for example, the proximity of mobile devices to the first base station.

Figure 6:
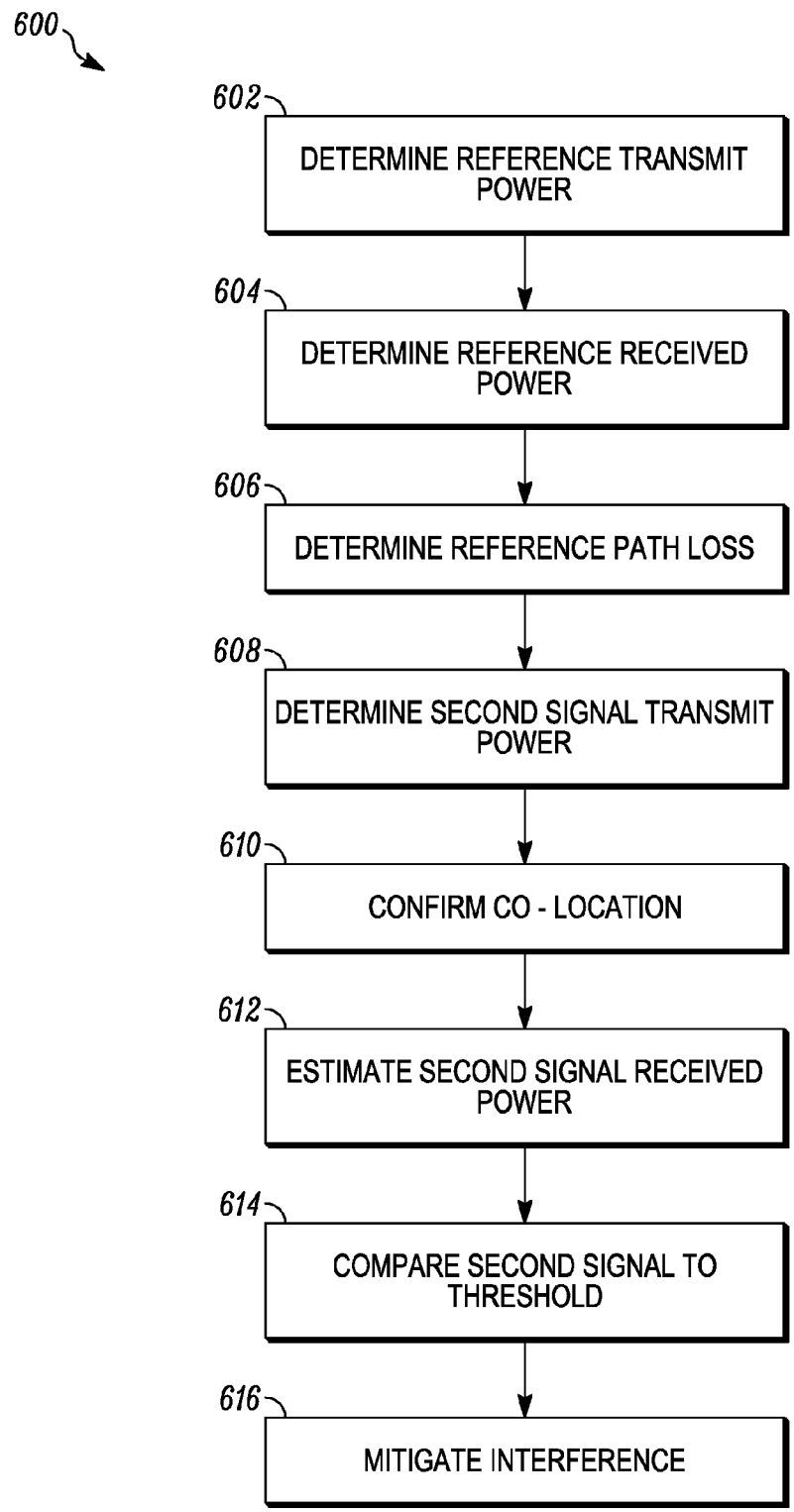
FIG. 6 is a flow diagram illustrating a method of detecting out of band interference in accordance with some embodiments.

An exemplary method for estimating the received power level of an interfering signal and determining if it exceeds a threshold value will now be described in detail in conjunction with FIG. 6. In particular, a method 600 for detecting RF interference from an adjacent channel includes determining the power level at which a reference signal is transmitted from a first mobile device to a first base station in a first frequency band and in accordance with a first modulation scheme (task 602). As discussed above, the power level of an uplink transmission from a mobile device to its base station operating in the same network is typically set by, or at least known by, the base station. In the case where the interfering mobile device is an LTE device, for example, the transmit power can be determined in accordance with power transmission control protocols set forth in the LTE standards.

The method further includes determining the power level at which the reference signal is received at the first base station (task 604). Since the first base station and first mobile device operate at the same frequency and in accordance with the same modulation scheme, the received power level of an uplink transmission may be directly measured by the first base station. Method 600 then determines the path loss of the reference signal, for example, by subtracting its received power from its transmitted power level (task 606).

Method 600 continues by determining the power at which a second signal is transmitted by a second mobile device to a second base station in a second frequency band and in accordance with a second modulation scheme (task 608). Method 600 continues by interrogating a database to confirm whether the first and second mobile devices are geographically co-located (task 610). In this regard, IG 436 may be used to share relational databases, look-up tables, or other suitable co-location data between the two networks to facilitate the determination of whether the two mobile devices are geographically co-located.

If the two mobile devices are geographically co-located, method 600 may then estimate the power level at which the second signal is received at the first base station (task 612). The power level at which the second signal (i.e., the interfering signal) is received at the first base station may be estimated, for example, by subtracting the path loss of the second signal from the transmit power level of the second signal. In this regard, the path loss of the second signal may be inferred from the path loss of the first signal with reasonable accuracy when both mobile devices are geographically co-located (e.g. in the same vehicle or on the same person).

The received power level of the interfering signal may then be compared to a threshold value (task 614) to determine if the received power level of the interference from an adjacent frequency channel meets or exceeds a predetermined level. If the threshold value is met or exceeded, the system may commence remedial or mitigation measures (task 616), as discussed above in connection with FIG. 5.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of estimating the power level of an interfering radio signal that is received at a first base station configured to communicate with a first mobile device at a first frequency, and which is transmitted by a second mobile device configured to communicate with a second base station at a second frequency, wherein the first and second mobile devices are geographically co-located and said first and second base stations share an interoperability gateway, the method comprising:
    calculating a path loss of a reference signal transmitted between said first mobile device and said first base station;
    providing a first parameter associated with a transmit power of said interfering signal to said interoperability gateway;
    estimating, based on said path loss and said first parameter, the received power level of said interfering radio signal; and
    causing said interfering signal to be mitigated based on said estimating step.

2. The method according to claim 1, wherein:
    said first base station is a public safety land mobile radio base station, and said first mobile device is a public safety land mobile radio device; and
    said second base station is a Public Safety broadband base station, and said second mobile device is a broadband radio device.

3. The method according to claim 2, wherein:
    said first mobile device transmits on a narrow band channel in the range of 799 to 815 megahertz; and
    said second mobile device transmits on a broadband channel in the range of 788 to 798 megahertz.

4. The method according to claim 1, wherein causing said interfering signal to be mitigated comprises reducing the transmit power of said interfering signal.

5. The method according to claim 1, wherein causing said interfering signal to be mitigated comprises rescheduling the transmission of said interfering signal.

6. The method according to claim 1, further comprising providing the interoperability gateway as a computer based platform for sharing operational data between base stations operating in spectrally distinct wireless networks and for estimating said received power level of said interfering radio signal.

7. The method according to claim 1, wherein calculating the path loss comprises:
    determining a power level at which said reference signal is transmitted by said first mobile device;
    determining a power level at which said reference signal is received at said first base station; and
    determining a difference between the power level at which said reference signal is transmitted and the power level at which said reference signal is received.

8. The method according to claim 1, wherein providing a first parameter comprises:
    determining a power level at which said interfering signal is transmitted by said second mobile device;
    assigning said power level of said interfering signal to said first parameter;
    providing said first parameter to said gateway by said second base station; and
    providing said first parameter to said first base station by said gateway.

9. The method according to claim 8, wherein estimating the received power level comprises subtracting a path loss of said interfering signal, inferred from the path loss of the reference signal, from said transmit power of said interfering signal.

10. The method according to claim 1, wherein said first mobile device is a hand-held unit, and said second mobile device is an LTE compliant vehicular modem.

11. The method according to claim 1, wherein said first and second mobile devices are geographically co-located (i) in a same vehicle, (ii) in a same room, or (iii) on a same person.

12. The method of claim 11, wherein said first and second mobile devices are geographically co-located in the same vehicle.

13. A method for detecting a predetermined threshold level of radio frequency interference from an adjacent frequency channel, the method comprising:

determining a transmit power level at which a reference signal is transmitted from a first mobile device to a first base station in a first frequency band and in accordance with a first modulation scheme;

determining a received power level at which said reference signal is received at said first base station;

determining a path loss of said reference signal by subtracting said received power of said reference signal from said transmit power of said reference signal;

determining a transmit power level at which a second signal is transmitted from a second mobile device to a second base station in a second frequency band and in accordance with a second modulation scheme;

interrogating a database and determining that said first and said second mobile devices are geographically co-located;

estimating a received power level at which said second signal is received at said first base station by subtracting said path loss from said transmit power level of said second signal; and comparing said received power of said second signal to a threshold value.

14. The method according to claim 13, wherein:

said first frequency band is in a range of 799 to 815 megahertz;

said second frequency band is in a range of 788 to 798 megahertz;

said first modulation scheme is compliant with Public Safety narrow band voice modulation standards; and said second modulation scheme is a Long Term Evolution (LTE) compliant broadband scheme.

15. The method according to claim 13, wherein said database comprises information pertaining to a plurality of emergency response Public Safety vehicles and mobile devices which are co-located in a same vehicle.

16. The method according to claim 13, further comprising executing a mitigation protocol when said received power of said second signal exceeds said threshold value.

17. The method according to claim 16, wherein said mitigation protocol comprises at least one of:

terminating said second signal;

reducing a transmit power of said second signal;

changing a modulation scheme of said second signal; and changing a frequency at which said second signal is transmitted.

18. The method of claim 13, further comprising interrogating the database and determining that said first and second mobile devices are geographically co-located comprises determining that said first and second mobile devices are geographically co-located (i) in a same vehicle, (ii) in a same room, or (iii) on a same person.

19. A system for determining a power level at which a signal transmitted between a first radio and a first base station in a first network is received at a second network operating in an adjacent RF channel and including a second base station and a second radio geographically co-located with said first radio, the system comprising:

a gateway for sharing operational data between said networks; and a computer configured to communicate with said gateway and to:

calculate a first path loss associated with a first signal transmitted between said first radio and said first base station;

estimate, based on said first path loss, a second path loss associated with a second signal transmitted between said first network and said second network;

determine a power level at which said second signal is received, based on the difference between:

a) a power level at which said second signal is transmitted; and b) said second path loss;

compare said received power of said second signal to a threshold value; and direct, via said gateway, said second base station to execute an interference mitigation protocol if said power level of said second signal exceeds said threshold value.

20. The system of claim 19, wherein the first radio and the second radio are geographically co-located (i) in a same vehicle, (ii) in a same room, or (iii) on a same person.

* * * * *